Nov. 14, 1939.                C. RAPP                2,180,214
                          UNIVERSAL HEAD
                       Filed March 3, 1938
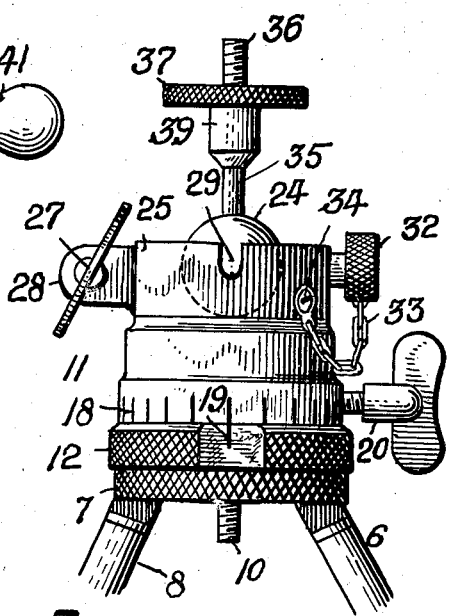
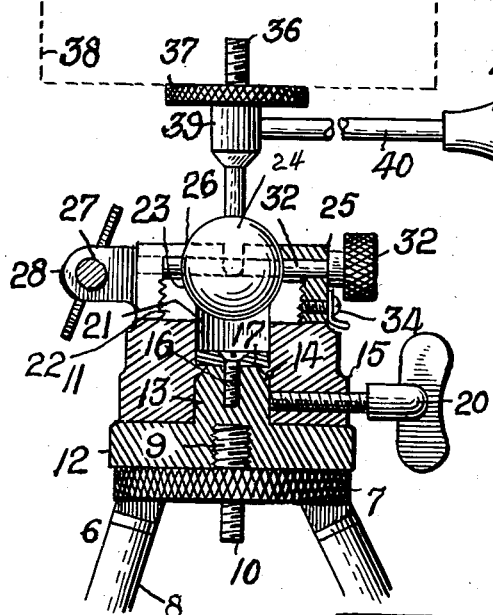
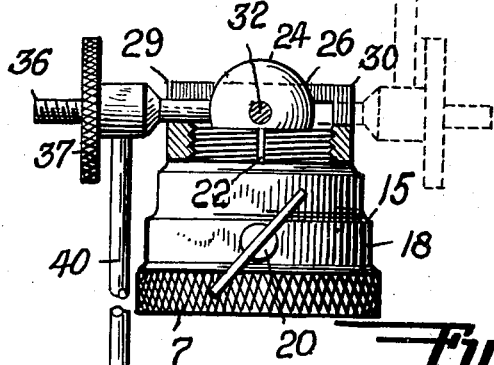
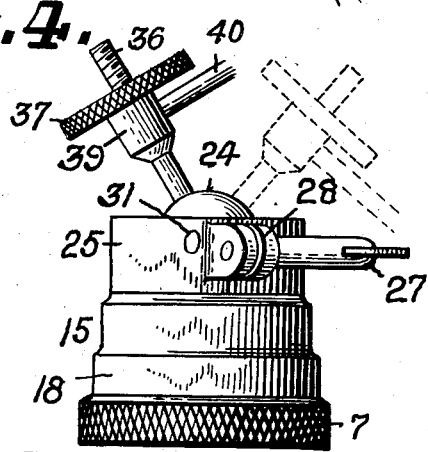
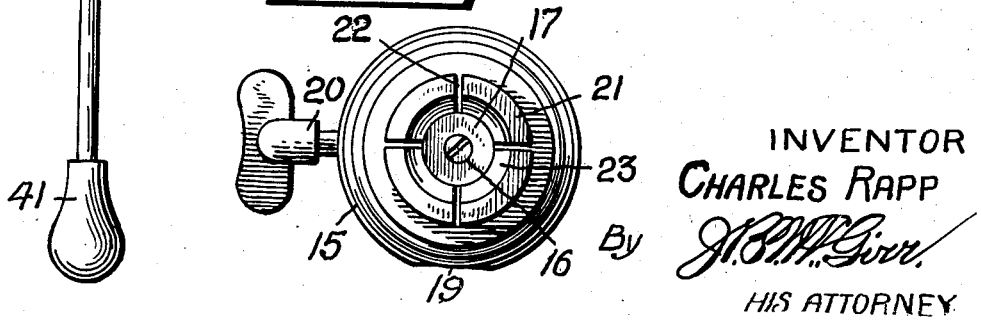
INVENTOR
CHARLES RAPP Patented Nov. 14, 1939

2,180,214

UNITED STATES PATENT OFFICE 2,180,214

UNIVERSAL HEAD

Charles Rapp, Brooklyn, N. Y.

Application March 3, 1938, Serial No. 193,694

5 Claims. (Cl. 248—181)

The present invention relates to a new and useful improvement in universal heads for camera tripods, and more especially refers to means for attaching the camera to the tripod to hold the camera not only secure to the tripod, but in any desired angle.

The main object of the invention is to provide a universal head that may be used to hold any camera to a tripod, be it an ordinary camera, or a movie design, and to provide means whereby the same universal head may be used for either type of camera.

Another object of the invention is to provide a universal head that is neat, small in size, durable, compact and simple in its construction, and one adapted to be used for a movie camera when a pin is inserted in the spherical body, by this means the camera may easily and rapidly be adjusted to any desired position back or forward, from vertical to horizontal for taking pictures with the camera pointing towards the ground or to the sky, or at any intermediate angle there between, and with the pin withdrawn the universal head forms a regular universal head, whereby it may be used for any ordinary camera that may be adjusted not only to any desired angle, but positively held secure in that position.

The present invention is particularly adapted for use in connection with cameras whereby the tripod being placed in a particular position, with the universal head having the scale on its side, the camera may be turned in azimuth or elevation or both for taking several pictures, and then joining them end for end to form an enlarged picture.

The invention comprises a novel construction, combination and arrangement of parts hereinafter more especially described and illustrated in the accompanying drawing, which refers particularly to preferred exemplary embodiments of the invention. However, as many changes could be made in the above construction and many apparent widely different embodiments of this invention could be made without departing from the scope thereof, it is intended that all matter contained in the description, drawing and claims shall be interpreted as illustrative and not in a limited sense.

Referring to the drawing, the same parts of the several figures thereof have corresponding reference characters.

Fig. 1 is a side view of my improved universal head to be attached to a tripod, showing its use for a movie camera;

Fig. 2 is a vertical sectional view of the same;

Fig. 3 is a partial sectional view to show the means for locking the parts in position;

Fig. 4 is a view showing the pin removed, and the universal head adapted to be used for tilting the camera in any position or direction, and Fig. 5 is a partial plan view showing the top housing the sphere being removed so as to show the yielding jaws.

In the drawing, Figs. 1, 2 and 3 show the many positions a camera may assume with the use of my universal head, all of which will appear to those familiar with the use of cameras, its practical application for the purposes for which it was designed. In said figures the device is shown adapted to receive an ordinary camera, and to adapt the same to operate in any position with its lens pointing towards the floor or to the sky or in any intermediate position therebetween. The tripod 6 comprises the usual head 7, and the usual three legs 8, which are pivoted so that the legs may be turned in the opposite direction, so as to bring the screw 9 or 10 on top as may be desired. Of course, it will be understood that a separate adapter bushing 12 may be provided so as to accommodate the head to either screw that may be needed for the particular camera that is to be used. By having the extra adapter to fit either of the screws 9 or 10, the universal head offers a distinct advantage by providing means for receiving either the American or foreign make of cameras on the same tripod.

As noted it is desirable to provide base adapters such as is shown at 12, to accommodate both sets of cameras, the only difference being that each adapter bushing would have a different size threaded bore to receive either the screw 9 or 10. The screw 9 forms a part of the tripod head 7, as does the screw 10 on the opposite side. The universal head 11 which comprises the nurled base adapter bushing 12, is provided with an upwardly projecting stud 13, having a recess about its upper edge to receive a corresponding lip 14 extending inwardly on a movable member 15. The stud 13 has a threaded bore to receive a screw 16 which holds the plate 17 to the movable member 15, and the base adapter 12, and permits of the same being turned on the stud 13, thus it will be seen that the parts are all movably attached to each other ready for any desired adjustment by the operator. To the lower edge of said member 15 is etched a scale 18 the graduations of which may be read from a flat 19. These calibrations are spaced so that the operator may take several pictures by moving his camera in azimuth to the next mark which will allow the picture when printed to be placed end to end so as to form one large picture. This is done by releasing the screw 20 from its central contact, by the release of the screw the camera may be turned bodily around in a horizontal plane in part or the whole 360°, about the pivotal stud as has been noted.

The member 15 has an upwardly screw threaded projection 21 which is suitably slotted as at 22, while on its inside it is provided with a partial spherical seat 23 for the spherical member 24, that is to be held therein, and by means of which the camera may have a universal movement. A split ring member 25, which is provided with its upper and inner face in the form of a cup 26 so as to fit and hold the spherical member 24 in place. The clamping jaws of the split ring 25 are regulated by the screw 27, which locks the spherical member against movement. By reason of the sphere 24 being so located and arranged, it is adapted to be used for both styles of cameras, viz., ordinary or movie, by simply inserting or removing the pin 32.

This member 25 in addition to having the clamping jaws 28, is provided with notches 29 and 30 as shown in Figs. 1, 2 and 3, on opposite sides to receive and hold the stem 35 in a horizontal position when the lens of the camera is pointing towards the floor, such as when making pictures of objects for assembly of parts, or when the lens is pointing upwardly for taking of objects in the sky. A central bore 31 in the split ring 25 registers with a like bore through the sphere 24, into which may be placed a pin 32, the latter having a nurled head for the proper handling of the same, the pin may also be provided with a short chain 33 to keep it convenient when wanted. A small screw 34 not only holds the end of the chain to the head, but at the same time locks the split ring member 25 to the member 15. Thus it will be seen that the parts are all adapted to be securely held together, and the camera will be held in any of the various positions that may be desired.

Attached to the spherical member 24 is an upwardly extending stem 35, terminating with a screw 36 to which the camera is secured; a knurled base 37 is secured thereto which forms a base for the camera head (not shown) forming a part of the camera.

Again, should it be so desired by the operator, the head 7 of the tripod, may have permanently attached thereto my universal head, that may form a part of the tripod itself. By the use of my universal head it is not necessary to have any leveling attachments of any character; the lines on the ground glass in the camera will show the relative position of the picture on the ground glass. The same is true when the pin 32 is in place, the camera will be held in that level position no matter in what position the same may be placed about the pin, as shown in Fig. 3.

Having described my invention, what I claim as new and desire to secure by Letters Patent is:

1. A camera head of the character described comprising a ball-supporting portion and a camera-supporting ball seated for movement in said portion, said ball being normally movable universally with respect to the latter, and means associable with said ball and portion for restrictive movement of said ball to a single general plane.

2. A universal camera head comprising a ball-supporting portion and a camera-supporting ball seated for movement in said portion, said ball being normally movable universally with respect to the latter, and means associated with said ball and portion for restrictive movement of said ball to a single general plane, said means including a pin removably extending through said ball and ball-supporting portion.

3. A universal camera head of the character described comprising a casting having a substantially centrally located, upwardly extending pivot thereon, an annular second casting arranged on said first casting about said pivot for rotary movement relative thereto, releasable means for binding said castings together against relative rotary movement, said second casting being formed with partially spherical seat thereon, a camera-supporting ball mounted for universal movement on said seat, means on said ball for connecting a camera thereto, an annular split ring encompassing said ball, means for threadedly interconnecting said split ring and second casting, and releasable means for clamping said split ring about said ball to hold the latter in position on said seat.

4. A universal camera head of the character described comprising a casting having a substantially centrally located, upwardly extending pivot thereon, an annular second casting arranged on said first casting about said pivot for rotary movement relative thereto, releasable means for binding said castings together against relative rotary movement, said second casting being formed with a partially-spherical seat thereon, a camera-supporting ball mounted for universal movement on said seat, means on said ball for connecting a camera thereto, an annular split ring encompassing said ball, means for interconnecting said split ring and second casting, and releasable means for clamping said split ring about said ball to hold the latter in position on said seat, said ball and split ring being provided with alignable openings extending therethrough for the reception of a pin for restricting the movement of said ball to a single general plane.

5. A camera head of the character described comprising a ball-supporting portion and a camera-supporting ball seated for movement in said portion, said ball being normally movable universally with respect to the latter, a handle integrated with said ball for effecting said movement thereof, means for securing said ball against movement in any desired position on said ball-supporting portion, and means associated with said ball and portion to restrict the movement of the ball to a single general plane.

CHARLES RAPP.